(12) United States Patent
Karnachev et al.

(10) Patent No.: US 11,340,134 B2
(45) Date of Patent: May 24, 2022

(54) METHOD FOR FLUID MEASUREMENT FOR A DISCRETE AREA OF A FLUID SUPPLY NETWORK

(71) Applicant: Siemens Aktiengesellschaft, Munich (DE)

(72) Inventors: Alexey Alexandrovich Karnachev, Oblast Archangelsk g. Mirny (RU); Oleg Vladimirovich Mangutov, St. Petersburg (RU); Ilya Igorevich Mokhov, St. Petersburg (RU); Alexey Petrovich Kozionov, Pskov (RU); Nicolay Andreevich Veniaminov, St. Petersburg (RU)

(73) Assignee: Siemens Aktiengesellschaft, Munich (DE)

( * ) Notice: Subject to any disclaimer, the term of this patent is extended or adjusted under 35 U.S.C. 154(b) by 752 days.

(21) Appl. No.: 16/081,405

(22) PCT Filed: Jun. 20, 2016

(86) PCT No.: PCT/RU2016/000370
§ 371 (c)(1),
(2) Date: Aug. 30, 2018

(87) PCT Pub. No.: WO2017/222403
PCT Pub. Date: Dec. 28, 2017

(65) Prior Publication Data
US 2021/0148781 A1  May 20, 2021

(51) Int. Cl.
*G01M 3/28* (2006.01)
*G01F 15/00* (2006.01)
*G01F 15/075* (2006.01)

(52) U.S. Cl.
CPC ............ *G01M 3/28* (2013.01); *G01F 15/005* (2013.01); *G01F 15/0755* (2013.01); *G01M 3/2815* (2013.01)

(58) Field of Classification Search
CPC .... G01M 3/2815; G01M 3/2807; G01M 3/28; G01F 15/0755
See application file for complete search history.

(56) References Cited

U.S. PATENT DOCUMENTS

| | | |
|---|---|---|
| 4,200,911 A | 4/1980 | Matsumoto |
| 6,021,677 A | 2/2000 | Hepner |

(Continued)

FOREIGN PATENT DOCUMENTS

| | | |
|---|---|---|
| CN | 103430002 | 12/2013 |
| CN | 105492874 | 4/2016 |

(Continued)

*Primary Examiner* — Paul M. West
(74) *Attorney, Agent, or Firm* — Cozen O'Connor

(57) ABSTRACT

A method for fluid flow measurement for a discrete area of a fluid supply network, where the fluid supply network includes a network of pipes that includes a main pipe for transporting fluid from a source into the fluid supply network for delivery to consumers, wherein the main pipe crosses a boundary between the discrete area and a further area of the fluid supply network, which is outside of the discrete area, and a plurality of distribution pipes each transport fluid from the main pipe to a consumer, where fluid pressure and the fluid consumption on at least two selected key metering points located inside and outside of the discrete area are measured, and where the fluid pressure and the fluid consumption measured on these selected key metering points the fluid flow in the main pipe that crosses the boundary of the discrete area is calculated.

9 Claims, 5 Drawing Sheets

(56) References Cited

U.S. PATENT DOCUMENTS

| | | | |
|---|---|---|---|
| 2013/0197833 A1* | 8/2013 | Israeli | G01M 3/2815 |
| | | | 702/51 |
| 2013/0231876 A1 | 9/2013 | Hanss et al. | |
| 2014/0028459 A1 | 1/2014 | Solomon | |
| 2015/0308627 A1 | 10/2015 | Hoskins et al. | |

FOREIGN PATENT DOCUMENTS

| | | |
|---|---|---|
| DE | 102014205332 | 9/2015 |
| GB | 2424966 | 10/2006 |
| JP | H09217900 | 8/1997 |

* cited by examiner

FIG 1 -- PRIOR ART --

METHOD FOR FLUID MEASUREMENT FOR A DISCRETE AREA OF A FLUID SUPPLY NETWORK

CROSS-REFERENCE TO RELATED APPLICATIONS

This is a U.S. national stage of application No. PCT/RU2016/000370 filed Jun. 20, 2016.

BACKGROUND OF THE INVENTION

1. Field of the Invention

The present invention relates to a method for fluid flow measurement for discrete areas inside a fluid supply network.

2. Description of the Related Art

Pipeline networks are the most economic and safest mode of transportation for fluids like water, oil, gases and other fluid products. As a way to provide long-distance transport, pipelines have to fulfill high demands of safety, reliability and efficiency. If properly maintained, pipelines can last indefinitely without leaks. The leaks in the pipeline network can be caused by various reasons, e.g., damage from nearby excavation equipment, corrosion of pipes, accidents or earth movement.

Such a system of interconnected pipes that carries a pressurized fluid, such as water, oil, gases and other fluid products, is called hydraulic supply network. When monitoring hydraulic supply networks, one often faces the task of leakage detection and leakage localization. If there is a problem in the network, then it is very important to troubleshoot the defect in short time. Timely localization of the problem allows a reduced cost of repair and possible liquid losses on the network. Consequences of the leakage can be very destructive.

Any fluid supply network, including a water supply system, typically includes fluid sources or fluid storage facilities such as reservoirs, tanks, pressurizing components, such as pumping stations or pumps, etc., and a pipe network for distribution of fluid to the consumers.

Further the fluid supply network is considered on an example of a water supply network.

A water supply system or water supply network also belongs to the hydraulic supply networks that provide water supply to different types of consumers.

The water in the supply network is maintained at a positive pressure to ensure that water reaches all parts of the network, that a sufficient flow is available at every take-off point, i.e. at every consumer, and to ensure that untreated water in the ground cannot enter the network. The water is typically pressurized by the pressurizing components.

Different types of pipes are used in the pipe network of the water supply network. In general, the pipes can be classified in two categories depending on purpose (i) main pipes or transportation pipes, which are mainly long pipes located underground with large diameters of, for example, 300-700 mm, but can be of giant diameters of more than 3 m, moving pressurized water from the water storage facilities into the town or district of the town, and (ii) distribution pipes, which are pipes with small diameters of, for example, 80-300 mm, used to take the water from the main pipes to the consumers, which may be private houses as whole or each apartment individually, or industrial, commercial or institution establishments, and other usage points such as fire hydrants.

The topology of the water supply network is well known by the utilities companies who service the network. This means that further characteristics of the water supply network are well known, e.g., structure and arrangements of pipes, diameters of pipes, pipes lengths, or location of sensors of different types.

By now, water has become one of the most important goods in the 21st century. However, sometimes considerable water losses occur in water supply networks.

The term "water loss" is generally adopted to indicate the difference between the overall amount of water supplied into the network and the sum of the water volumes corresponding to the consumers' consumption recorded by flow meters installed on consumers' nodes.

These water losses can be divided into two groups (i) the apparent losses, e.g., unrecorded water volumes used for public functions, such as cleaning of roads and urban areas, irrigation of green spaces, operation of public fountains, fire-extinguishing service, which consist of water volumes actually consumed but not accounted for, and (ii) the real losses, which are caused by damages that may have occurred to the network pipes or by the deterioration of the pipe junctions or the hydraulic devices. Real losses are the physical losses of water from the water supply system, also referred as "water leakages".

These losses put a strain on water supply and inflate the management cost for the water utilities because they represent water that is extracted and treated but never reaches the consumers.

In many cases, minor water leakages deriving from the inefficient hydraulic seal of junctions or from small cracks on pipes may lie hidden for a long time, sometimes for months or even years. Major leakages can be easily observed when significant damages to the pipes occur, because they usually result in large amounts of water erupting from ground or flowing in the consumer properties.

The proven method around the world to reduce leakage from the water supply system is to proactively find the leaks before they appear at the surface. This can be achieved by monitoring the network and has the benefits of reducing the time the leaks are running, and wasting water.

According to international and national standards, the best practice method for monitoring a water supply network is to sectorize it into district metered areas (DMA). A DMA is an area with strict boundaries within the water supply network with measured inflow into this discrete area. This technique was first introduced at the beginning of the 90s.

A DMA represents an area of a water supply network in which the quantities of water entering and leaving the district are metered.

In a traditional way, when subdividing the water supply network into areas and DMAs, respectively, an attempt was always conventionally made to form the areas such that only one inflow or inflow main pipe resulted that can be monitored using a single flow meter.

FIG. 1 illustrates a prior art water supply network 1 with a water source (not shown in FIG. 1), pumping station 3, main pipes 4 and distribution pipes 5. The water supply network 1 comprises a District Metered Area 2. Valves 6 and flow meters 7 are located at boundaries 8 between the DMA 2 and further areas 9 of the supply network 1. Main pipes 4 crosses the boundary 8 to provide water for consumers 10 in the DMA 2. Distribution pipes 5 are used to connect the consumers 10 with the main pipes 4 in the DMA 2. All main pipes 4 of the DMA 2 are equipped with flow meters 7 for measuring all inflow and outflow of the DMA 2 and/or valves 6 that allows shut off of the flow inside the main pipe 4. Therefore, as soon as flow meters 7 and valves 6 are installed into all main pipes 4 that cross the DMA 2 boundary 8, all inflow and/or outflow of water into and out of DMA 2 can be measured. This information might be further used for leakage detection, water balance calculation in the DMA 2, etc.

The prior art DMA's approach, however, has its disadvantages. Firstly, dividing the water supply network into smaller areas comes with a cost—the cost of an area survey, installation design, flow meter and chamber installation etc., is substantial, particularly if small areas (e.g., less than 1000 consumers) are chosen. The main pipe diameters are big (typically more than 300 mm). Consequently, flow meters and valves to be installed on this main pipes are big and therefore also expensive.

Moreover, creating DMAs by traditional ways requires the 'permanent' closure of many boundary valves—and, because of area supply arrangements and network characteristics (such as topography and low system pressures) some networks are hydraulically difficult to divide into single-feed DMAs without disadvantaging consumers.

The key to DMA management is the correct measurement and analysis of the flow in and out of the DMA and the flow consumed by the end-users, i.e., consumers. The water consumed by the consumers inside the DMA can be easily calculated, because in most cases consumers have water gauges installed. However the measurement of inflow into the DMA and outflow from the DMA is not an easy task.

In general, the existing ways of measuring fluid flow into and out of a discrete area, e.g., a district metered area, of a supply network require very sophisticated and expensive flow meters, the installation of which is complex, costly and time consuming.

SUMMARY OF THE INVENTION

In view of the foregoing, it is an object of the invention to provide a method for easily and conveniently achieving fluid flow measurement in a discrete area, especially for the district metered areas, of the fluid supply network.

This and other objects and advantages are achieved in accordance with the invention by a system for fluid flow measurement for a discrete area of the fluid supply network and a method for fluid flow measurement for a discrete area of a fluid supply network, where the fluid supply network comprises a network of pipes for delivering a fluid to consumers. The network of pipes comprises at least one main pipe to transport fluid from a source into the fluid supply network, wherein the main pipe crosses a boundary between the discrete area and a further area of the fluid supply network, that is outside of the discrete area, and a plurality of distribution pipes, wherein each distribution pipe is adapted to transport fluid from the main pipe to a consumer fluidly connected to the distribution pipe.

The junctions of at least two pipes, main and/or distribution pipes, establish nodes. Thus, two nodes that are located on the same pipe, preferably on the main pipe, from the different sides of the discrete area boundary are boundary nodes. There are no other nodes between the boundary nodes.

The distribution pipes are equipped with a plurality of key metering points. Each key metering point is fitted with a pressure sensor and a consumption gauge. Therein, each pressure sensor is adapted to perform a measurement of fluid pressure $P_1$, $P_2$ in the distribution pipe (5, 13) where the pressure sensor is installed. In addition, each consumption gauge is configured to measure fluid consumption $q_1$, $q_2$ by consumers that are fluidly connected by the distribution pipe.

In accordance with the method, during the steps a) and b) the fluid pressure $P_1$, $P_2$ and the fluid consumption $q_1$, $q_2$ on at least two selected key metering points that are located inside and outside of the discrete area are measured, where the fluid pressure $P_1$, $P_2$ and the fluid consumption $q_1$, $q_2$ measured on these selected key metering points the fluid flow $Q_i$ in the main pipe that crosses the boundary of the discrete area is calculated during the step c of the method.

The same method should be applied to calculate the fluid flow $Q_i$ for every further pipe that crosses the boundary of the discrete area. Afterwards, by summing up the fluid flows $Q_i$ of the individual main pipes the total fluid flow into/out of the discrete area can be calculated.

It is also an object of the present invention to provide a system for fluid flow measurement for a discrete area of a fluid supply network. In accordance with the present invention, the system comprises a plurality of key metering points where each key metering point is configured to be located on a distribution pipe and is equipped with a pressure sensor and a consumption gauge. Furthermore, at least one key metering point is located within the discrete area and at least one key metering point is located in the further area that is outside of the discrete area. The key metering points provides fluid pressure $P_1$, $P_2$ in the distribution pipes measured by the pressure sensors installed on these distribution pipes, and fluid consumption $q_1$, $q_2$ by consumers that are fluidly connected by the distribution pipe measured by consumption gauge.

Moreover, the system comprises a control unit that is configured to calculate the fluid flow $Q_i$ using the measured fluid pressure $P_1$, $P_2$ and the measured fluid consumption $q_1$, $q_2$ on the key metering points (14, 15) in accordance with the method of the invention.

Therefore, there is a fluid supply network with the system for fluid flow measurement for a discrete area of a fluid supply network.

The present invention is based on the insight that the inflow and outflow of the discrete area can be measured using pressure sensors and consumption gauges installed on distribution pipes that fluidly connect consumers to the main pipes instead of the traditional prior art approach based on measuring inflow and outflow by flow meters installed directly in the main pipes.

As mentioned above, the distribution pipes are pipes with small diameter (e.g., less than 300 mm) to carry the pressurized fluid from the main pipe to the consumers. The pressure sensors that are installed on the distribution pipes are relatively cheap in comparison with the flow meters. In addition, the installation process of the pressure sensors is not connected with the interruption of fluid supply to the consumers of the entire discrete area.

The consumers that are supplied through the distribution pipes might be a private house, as a whole one or each apartment, or industrial, commercial or institution establishments, and other usage points such as fire hydrants. The distribution pipes can provide the fluid to one consumer or to a conglomerate of consumers.

In most cases, it is assumed that the fluid consumption by the consumers on every distribution pipe is known due to the fact that there is a legal requirement to install consumption gauges, in other words individual flow meters, to measure individual consumption and to pay for the consumed liquid, in case of water supply network, to pay for the consumed water. The service companies trace that the consumption gauges installed on the consumers' nodes are replaced regularly in order for the consumption measurements to be reliable and accurate. Therefore, the consumption by the consumers is well known.

Consequently, as soon as the fluid pressure on the two distribution pipes that are located from both sides of discrete area boundary is measured by pressure sensors and the fluid consumptions by consumers on both distribution pipes are known, the fluid flow in the main pipe that crosses the discrete area boundary can be calculated.

This approach can be easily extended for more than two distribution pipes.

Thus, the present invention is proposed to provide a new method and a system for fluid flow measurement for the discrete area of the fluid supply network.

In a possible embodiment of the method at the step c the fluid flow $Q_i$ is calculated based on the following relationship:

$$Q_i^\gamma = \frac{\Delta P^P}{R} = \frac{(P_1 + q_1^\gamma R_1) - P_2 + q_2^\gamma R_2}{R}, \text{ where} \quad \text{Eq. 1}$$

$Q_i$ is a fluid flow on the main pipe that crosses the boundary of the discrete area, i.e. between the two boundary nodes, $\Delta P^P$ is a pressure drop between the boundary nodes, R is an equivalent hydraulic resistance of the main pipe that crosses the boundary of the discrete area, $R_1$, $R_2$ are an equivalent hydraulic resistances of the distribution pipes on which the selected key metering points are installed, $P_1$, $P_2$ are the fluid pressure in the distribution pipes measured by the pressure sensors that are installed on the selected key metering point, $q_1$, $q_2$ are the fluid consumptions on the selected key metering points measured by the consumption gauges, and $\gamma$ is a flow exponential parameter, where the $\gamma$ depends on the mode of fluid current, such as laminar, or turbulent, inside the pipe and used hydraulic approach. For example, in the Darcy-Weisbach equation $\gamma=2$. The Darcy-Weisbach equation is used for the water supply networks and turbulent mode of fluid current.

The equivalent hydraulic resistance R, $R_1$, $R_2$, of a pipe, the main pipe or distribution pipe, can be calculated by using the characteristics of the pipe, such as length of the pipe between nodes, pipe roughness, or inside pipe diameter, which are known to experts.

The above Eq. 1 of the fluid flow $Q_i$ allows the calculation of the fluid flow $Q_i$ in the main pipe through the boundary of the discrete area without having a costly flow meter installed on the main pipe.

In another possible embodiment of the method, criteria to select appropriate key metering points for the measurements at the steps a) and b) to be taken are defined.

At step a) the fluid pressure $P_i$ and the fluid consumption $q_i$ should be measured on the at least one selected first key metering point that is located inside of the discrete area. Moreover, this selected first key metering point is located on distribution pipes that are fluidly connected to the boundary node that is inside of the discrete area.

At the step b), the fluid pressure $P_i$ and the fluid consumption $q_i$ should be measured on the at least one selected second key metering point that is located outside of the discrete area, i.e., inside the further area. Moreover, this selected key metering point is located on distribution pipes that are fluidly connected to the boundary node that is outside of the discrete area.

Furthermore, for the measurement at the steps a and b, all and only such key metering points should be selected and used for further measurement, which are located on their distribution pipe such that no further first key metering point is located between the respective selected key metering point and the respective boundary node inside or outside the discrete area.

The above criteria of selection of the key metering points for the further measurement makes the calculation of the fluid flow in and/or out of the discrete area more accurate and precise.

The fluid flow $Q_i$ through the main pipe that crosses the boundary into or out of the discrete area can be calculated by using the Kirchhoff's system of equations, that are well known, applied to the water supply network.

The system of equations should include equations for every selected key metering point to calculate the fluid pressure in the node of accession of a distribution pipe where the respective selected key metering point is installed on:

$$P_{node\ i} = P_i + q_i^\gamma * R_1 \quad \text{Eq. 2}$$

where $P_{node\ i}$ is a fluid pressure in the i-node of accession of a distribution pipe where the respective selected key metering point is installed on, $P_i$ is the fluid pressure in the distribution pipe measured by the pressure sensor that is installed at the selected key metering point, $R_i$ is an equivalent hydraulic resistances of the distribution pipe on which the selected key metering points is installed, $q_i$ is the fluid consumptions at the selected key metering points measured by the consumption gauges, and $\gamma$ is a flow exponential parameter, as described above.

Also for every two nodes i and j that are next to each other inside, the area limited by the selected key metering points the fluid transport equations should be created:

$$Q_{i-j}^\gamma = \frac{P_i - P_j}{R_{i-j}} \quad \text{Eq. 3}$$

where $Q_{i-j}$ is the fluid flow through the pipe between two nodes i and j, $P_i$, $P_j$ is the fluid pressure in the respective nodes i and j, and $R_{i-j}$ is an equivalent hydraulic resistance of the pipe between the respective nodes i and j.

Moreover, for every node on the main pipe that is located between the boundary of the discrete area and the respective key metering point, the equation in accordance with the Kirchhoff's junction rule should be created. The Kirchhoff's junction rule means that the algebraic sum of fluid flows meeting at a node is zero.

Such system of equations can be solved because the number of the unknown parameters equals the number of equations created. Therefore, the fluid flow $Q_i$ through the main pipe that crosses the boundary into or out of the discrete area can be derived from this system.

In a possible embodiment of the method, the selected key metering point equipped with the pressure sensor and the consumption gauge can have the pressure sensor and the consumption gauge located in different places on the distribution pipe, such that the consumption gauge is located downstream the pressure sensor. This feature allows more flexibility in equipment installation in the fluid supply network.

In a possible embodiment, the method can be applied for the case when the selected key metering point is equipped with the plurality of the consumption gauges that are located downstream of the pressure sensor. In accordance with this embodiment, at the steps a) and b) of the method, the fluid consumption on the respective key metering point taken for further calculations of the fluid flow is calculated as a total fluid consumption measured via the plurality of consumption gauges.

This feature allows the use of an already existing system of consumption gauges without additional installations and optimizing the number of the pressure sensors to be installed.

In a possible embodiment, the method for fluid flow measurement for a discrete area of a fluid supply network is applied to a water supply network, where the discrete area is a district metered area DMA.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For a more complete understanding of the present invention and advantages thereof, reference is now made to the following description taken in accompanying drawings. The invention is explained in more detail below using exemplary embodiments which are specified in the schematic figures of the drawings, in which.

DETAILED DESCRIPTION OF THE EXEMPLARY EMBODIMENTS

Figure 1:
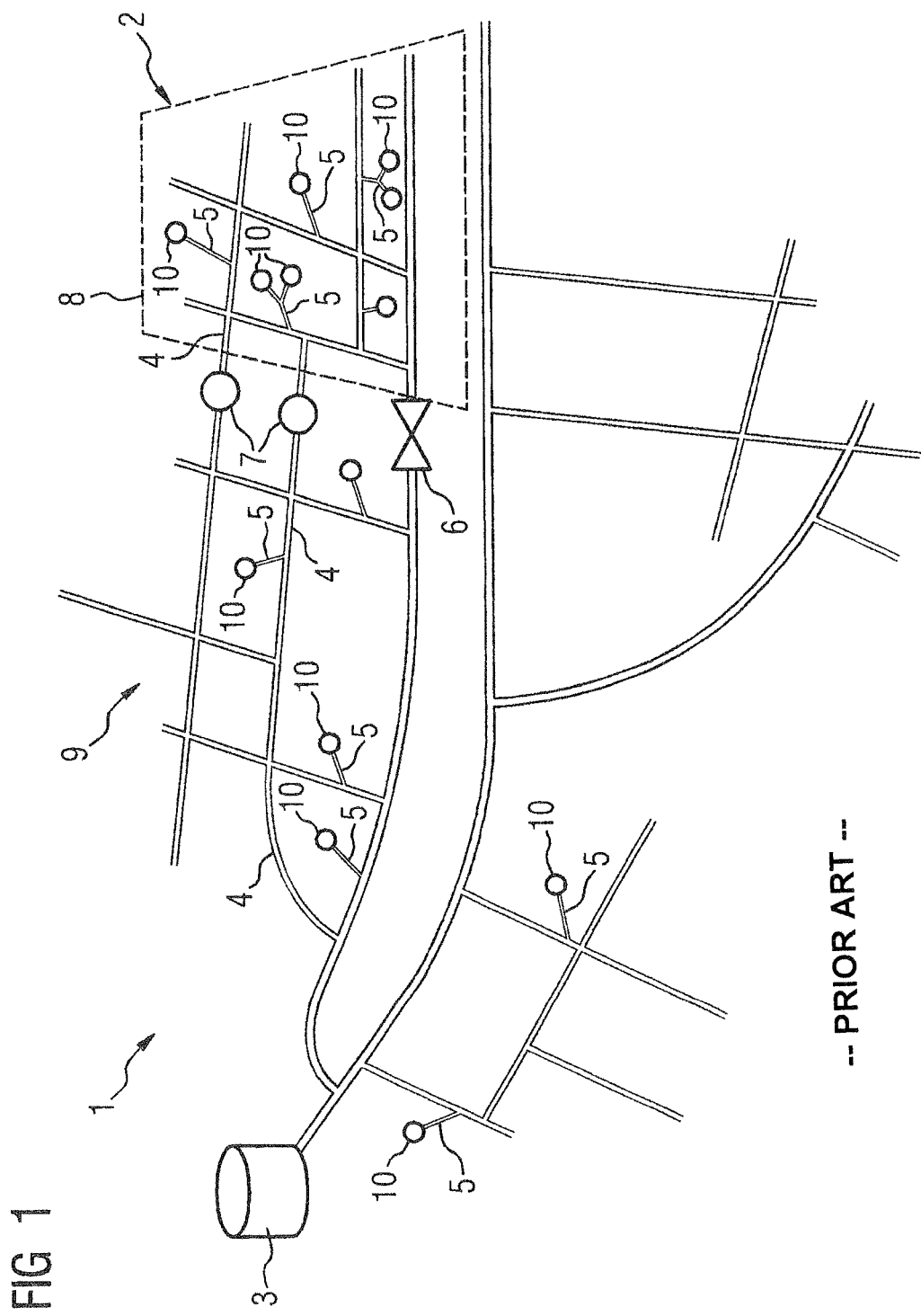
FIG. 1 shows a block diagram of a conventional fluid supply network with the DMA isolated in a traditional manner.

Various embodiments are described with reference to the drawings, where like reference numerals are used to refer to like elements throughout. In the following description, for purposes of explanation, numerous specific details are set forth in order to provide a thorough understanding of one or more embodiments. It may be evident that such embodiments may be practiced without these specific details.

The invention relates to a system 36 for fluid flow measurement for a discrete area 2 of a fluid supply network 1.

Figure 2:
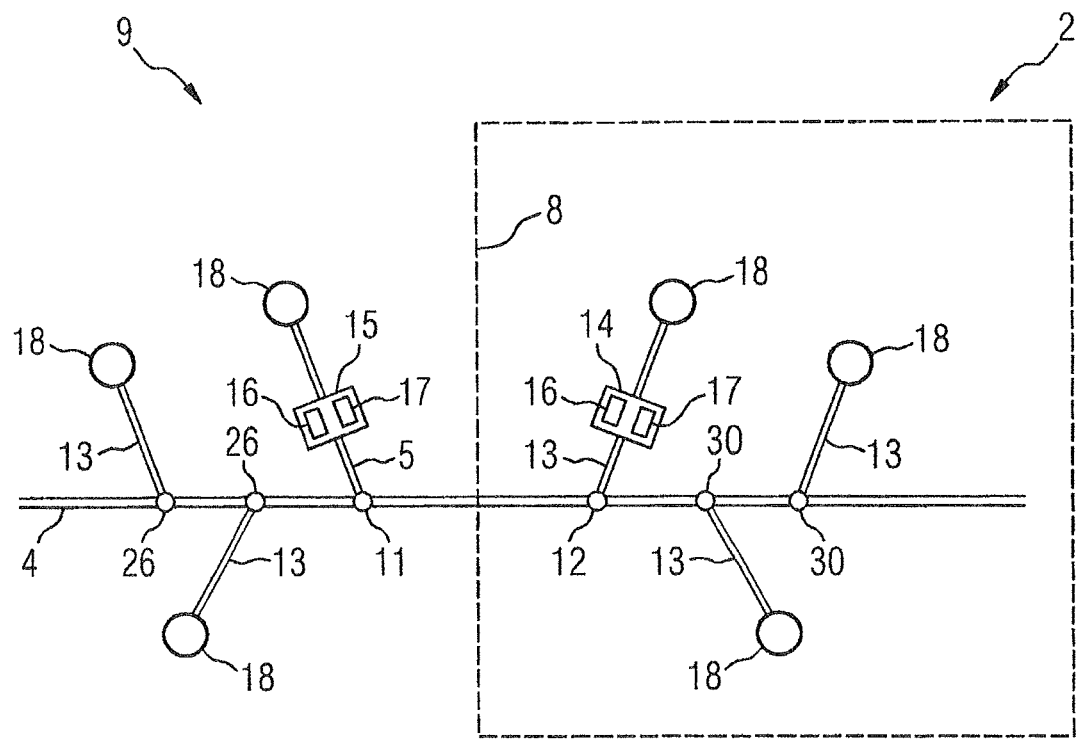
FIG. 2 shows a block diagram of a part of the fluid supply network with the discrete area isolated in accordance with the present invention.

FIG. 2 shows a block diagram of a part of the fluid supply network 1 with the discrete area 2 isolated in accordance with the present invention and illustrates the insight of what the invention is based on. The main pipe 4 of the fluid supply network 1 crosses the boundary 8 of the discrete area 2 of the fluid supply network 1, where the boundary 8 separates the discrete area 2 and a further area 9 of the fluid supply network 1. Distribution pipes 13 of the fluid supply network 1 fluidly connect the main pipe 4 with consumers 18.

In contrast to the prior art system shown in FIG. 1, there are no flow meters installed on the main pipe 4. Therefore there is no possibility to measure the flow through the main pipe 4 into or out of the discrete area 2 by traditional measures.

However there are junctions of at least two pipes, main pipe 4 and/or distribution pipes 13, which establish nodes 11, 12, 26, 30. Here, two such nodes 11, 12 that are located on the same main pipe 4 on different sides of the boundary 8 without any further nodes located between them are boundary nodes 11, 12.

These two boundary nodes 11, 12 are pipe junctions, in this particular case, the junctions of the main pipe 4 with the distribution pipes 5, 13. These two boundary nodes 11, 12 are located on the same main pipe 4, but from different sides of the boundary 10 of the discrete area 2: the boundary node 12 is located inside the discrete area 2 and the boundary node 11 is located outside of the discrete area 2, i.e., inside the further area 9.

Key metering points 14, 15 are installed between the boundary nodes 11, 12 and the consumers 18 on each of these distribution pipes 5, 13. Each of key metering points 14, 15 is equipped with a pressure sensor 16 and a consumption gauge 17, where each pressure sensor 16 is adapted to make a measurement of fluid pressure $P_i$ in the distribution pipe 5, 13 where the pressure sensor 16 is installed, and each consumption gauge 17 is configured to measure fluid flow $q_i$ through the distribution pipe 5, 13 where the consumption gauge 17 is installed, therewith measuring fluid consumption by consumer 18 that is fluidly connected to the main pipe 4 by the concerned distribution pipe 5, 13.

Figure 3:
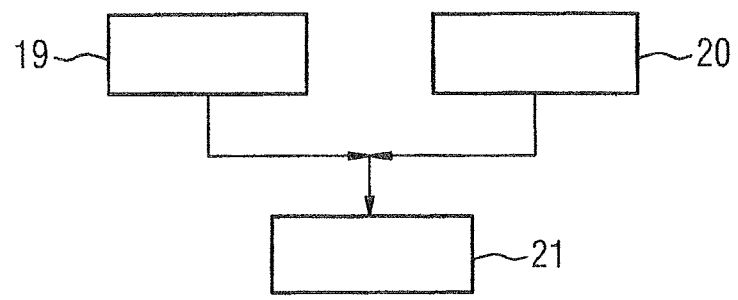
FIG. 3 shows a block diagram of a method for fluid flow measurement for a discrete area of a fluid supply network.

FIG. 3 shows a flow diagram of an embodiment of a method for fluid flow measurement for a discrete area 2 of the fluid supply network 1 according to the present invention.

At step 19 the measurement of the fluid pressure Pi and the fluid consumption qi on at least one selected first key metering point 14 that is located inside the discrete area 2 is performed.

At step 20 the measurement of the fluid pressure $P_2$ and the fluid consumption $q_2$ on at least one selected second key metering point 15 that is located outside the discrete area 2, i.e., in the further area 9, is performed.

At steps 19 and 20 the measurement of the fluid consumptions $q_1$, $q_2$ on each key metering point 14, 15 that are fluid flow q through the distribution pipes 5, 13 measured by the consumption gauge 17 are performed within a given time frame. The time frame can be 15 minutes, or 1 hour. The fluid pressure $P_1$, $P_2$ is the average of the fluid pressure within the time frame when the fluid consumption $q_1$, $q_2$ is measured. The less the time frame of measuring the fluid consumption, the more accurate the fluid flow Qi is calculated.

In the ideal case, measurements at steps 19 and 20 on different key metering points 14, 15 must be performed at the same time. However, performing such measurements on different key metering points 14, 15 with a time difference is possible. The time difference should be less that the time frame of measuring the fluid consumption $q_1$, $q_2$ on the respective key metering points 14, 15.

At step 21, the fluid flow Qi through the boundary 8 by the main pipe 4 is calculated using the measured fluid pressure $P_1$, $P_2$ and fluid consumption $q_1$, $q_2$ on the selected key metering points 14, 15 that are located inside and outside of the discrete area 2.

The flow Qi might be derived from the fluid transport equations:

$$Q_i^y = \frac{\Delta P^P}{R} = \frac{(P_1 + q_1^\gamma R_1) - P_2 + q_2^\gamma R_2}{R} \quad \text{Eq. 1}$$

where $Q_i$ is a fluid flow in the main pipe 4 that crosses the boundary 8 of the discrete area 2, i.e., between the two boundary nodes 11, 12, $\Delta P^P$ is a pressure drop between the boundary nodes 11, 12, R is an equivalent hydraulic resistance of the main pipe 4 between the boundary nodes 11, 12, $R_1$, $R_2$ are an equivalent hydraulic resistances of the distribution pipes 17, 5 on which the selected key metering points 14, 15 are installed, $P_1$, $P_2$ are the fluid pressure in the respective distribution pipe 17, 5 measured by the pressure sensors 16 that are installed on the key metering point 14, 15, $q_1$, $q_2$ are consumptions of the fluid on the key metering points 14, 15 measured by the consumption gauges 17, and γ is a flow exponential parameter.

As a result, an installation of a costly flow meter 7 on the main pipe 4 is not needed to measure the flow of the fluid $Q_i$ by using this approach.

The same method should be applied to calculate the fluid flow $Q_i$ for every further pipe that crosses the boundary 8 of the discrete area 2. Afterwards, by summing up the fluid flows $Q_i$ of the individual main pipes the total fluid flow into/out of the discrete area 2 can be calculated.

Figure 4:
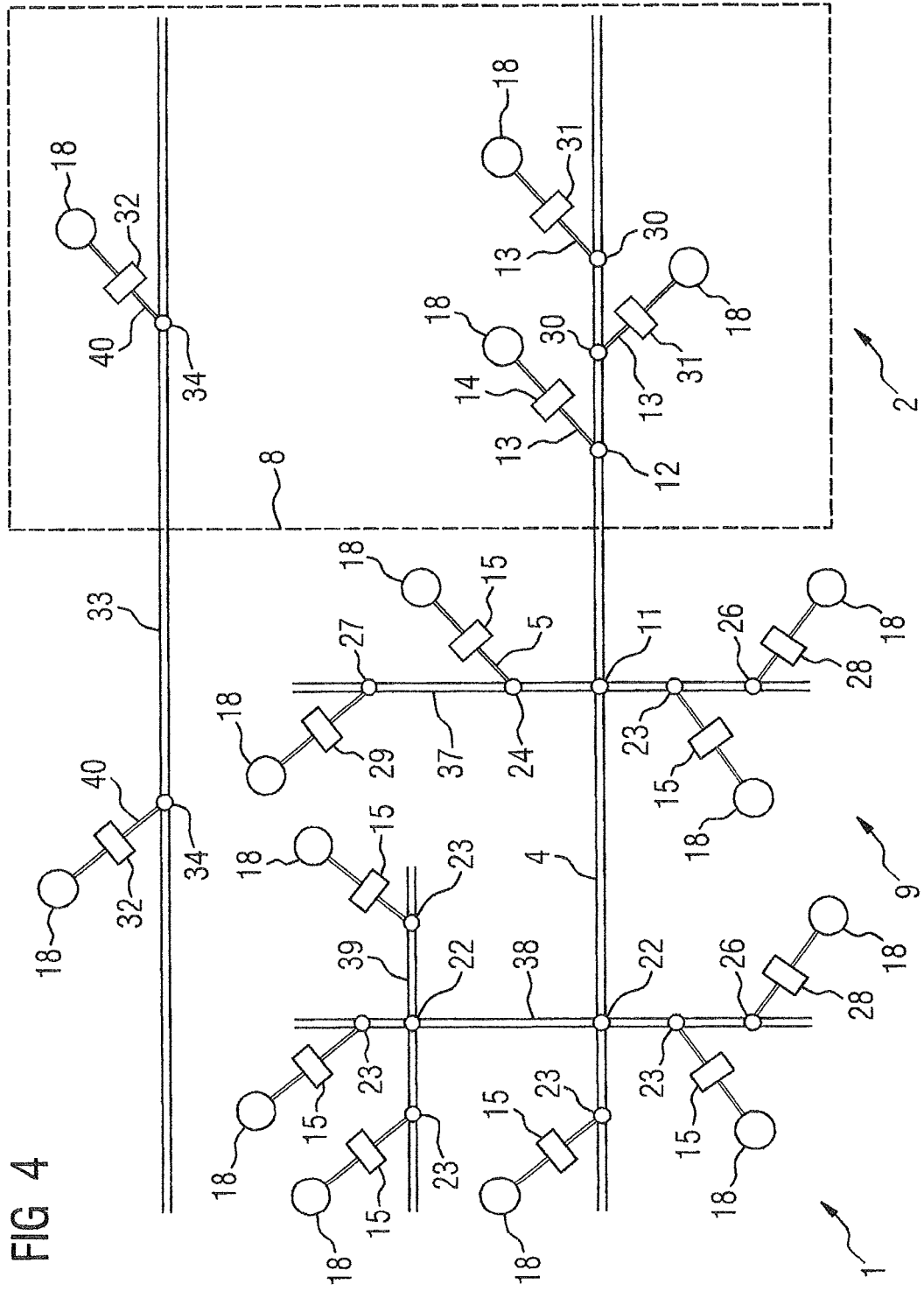
FIG. 4 shows a block diagram of a part of the fluid supply network with the discrete area isolated in accordance with an embodiment of the present invention.

Within an enhanced embodiment of the method, the criteria to select appropriate key metering points are defined to further improve accuracy of the fluid flow calculation. FIG. 4 illustrates how these criteria might be applied. FIG. 4 shows a part of the supply network 1. At least one main pipe 4 crosses the boundary 8 of the discrete area 2. Two boundary nodes 11, 12 are located on different sides of the boundary 8.

On one side of the boundary 8, inside of the discrete area 2, the boundary node 12 is a junction of the main pipe 4 and the distribution pipe 13 with the key metering point 14 equipped. There are also other nodes 30 in the discrete area 2 that are fluidly connected to the consumers 18 via distribution pipes 13 with key metering points 31 installed on them.

However, on the other side of the boundary 8 that is in the further area 9, outside of the discrete area 2, there is a complicated pipe structure with junctions that form nodes 11, 22, 23, 24, 26, 27. Some nodes 23, 24, 26, 27 are junctions of the main pipes 4, 37, 38, 39 with the distribution pipes 5, where the distribution pipes 5 are equipped with the key metering points 15, 28, 29. Other junctions 11, 22 are junctions of main pipes 4, 37, 38, 39 of the further area 9.

Every key metering point 14, 31, 15, 28, 29 is equipped with a pressure sensor 16 (not shown on this FIG. 4) and a consumption gauge 17 (not shown on this FIG. 4) and is adopted to measure the fluid pressure $P_i$ in the distribution pipes 5 on which they are installed and the fluid consumption $q_{Li}$ of the consumers 18 that are supplied with the fluid by the distribution pipes 5.

To provide accurate calculation of the fluid flow $Q_{11-12}$ through the boundary 8 on the main pipe 4 between two boundary nodes 11, 12, within the step 19 of the method, at least one selected first key metering point 14 in the discrete area 2 for taking measurement should be defined. The measurement of the fluid pressure 214 and the fluid consumption $q_{14}$ should be taken from the selected first key metering point 14 that is inside of the discrete area 2. To be selected for further measurements, the at least one selected key metering point should fit a requirement to be located next to the boundary node inside the discrete area 2. In other words, all and only such key metering points should be selected as first key metering points 14, which are located on their distribution pipe 13 such that no further key metering point is located between the selected key metering point 14 and the respective boundary node 12 inside the discrete area 2.

Other key metering points 31 in the discrete area 2, while located on the distribution pipes 13 that are fluidly connected to the boundary node 12, do not satisfy the requirement of being the next to the boundary node 12. Correspondingly, those remaining key metering points 31 should be excluded from the calculation of the fluid flow Q because the requirement of being the next to the boundary node 12 is not met and because the boundary node 12 itself includes the distribution pipe 13 with the key metering point 14 installed on it.

Furthermore, within step 20 at least one selected second key-metering point 15 for taking measurement for further fluid flow calculation should be defined and selected in the further area 9.

The key metering points 15 located in the further area 9 should be taken for further measurement. All of them are located on distribution pipes 5 that are fluidly connected to the boundary node 11 in the further area 9, and each selected second key metering point 15 is a next one to the boundary node 11, i.e., there are no further key metering points located between the respective selected second key metering points 15 and the boundary node 11 outside the discrete area 2, i.e., inside the further area 9. Lastly, all and only such key metering points 15 are selected as second key metering points 15, which are located on their distribution pipe 5 such that no further key metering point is located between the selected key metering point 15 and the boundary node 11 inside the discrete area 2.

In contrast, the remaining key metering points 29, 28 should be excluded from the calculation because the requirement of being the next to the boundary node 11 is not met. For example, between the boundary node 11 and the key metering point 29 there is another node 24 to which the distribution pipe 5 with one of the selected second key metering points 15 equipped on it is attached.

The key metering point 32 is not taken for further measurement because it is located on a distribution pipe 40 that is not fluidly connected to the boundary node 11. This key metering point 32 is located on another main pipe 33 that is fluidly connected to a boundary node 34. Therefore, the fluid flow on the main pipe 33 might be calculated separately using the steps 19-21.

After definition and selection of the first and second key metering points 14, 15 as described above, the fluid flow $Q_{11-12}$ through the main pipe 4 that crosses the boundary 8 between the boundary nodes 11, 12 into or out of the discrete area 2 can be calculated by using the Kirchhoff's system of equations, which are well known, applied to the water supply network 1.

The system of equations should include equations for every selected key metering point 15, 14 to calculate the fluid pressure in the nodes 12, 23, 24 of accession of a distribution pipe 5 where the respective selected key metering point 14, 15 is installed on as it was described above.

Also for every two nodes 23 and 22, 11 and 24, 11 and 23, 11 and 12 that are next to each other the fluid transport equations should be created:

$$Q_{i-j}^{\gamma} = \frac{P_i - P_j}{R_{i-j}} \qquad \text{Eq. 3}$$

where $Q_{i-j}$ is the fluid flow through the pipe between two nodes i and j, $P_1$, $P_j$ is the fluid pressure in the respective nodes i and j, and $R_{i-j}$ is an equivalent hydraulic resistance of the pipe between the respective nodes i and j.

Moreover, for every node 22, 11 that is a junction of a plurality of main pipes 4, 37, 38, 39 that is located between the boundary 8 and the respective key metering point 15 the equation in accordance with the Kirchhoff's junction rule should be created. The Kirchhoff's junction rule means that the algebraic sum of fluid flows meeting at a node 11, 22 is zero.

Such a system of equations can be solved because the number of the unknown parameters equals the number of equations created. Therefore, the fluid flow $Q_{11\text{-}12}$ through the main pipe 4 that crosses the boundary 8 between two boundary nodes 11, 12 into or out of the discrete area 2 can be derived from this system.

After the calculation of the fluid flow $Q_i$ is performed for every main pipe 4, 33 that crosses the boundary 8 of the discrete area 2, the total fluid flow can be derived by summing up the fluid flow $Q_i$ for every main pipe 4, 33.

Figure 5:
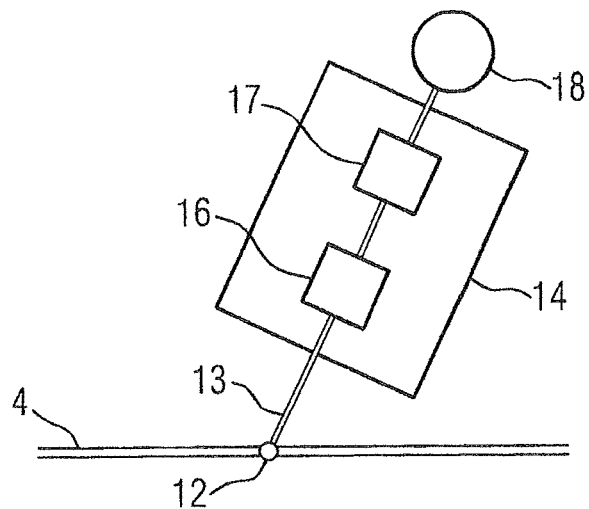
FIG. 5 shows a block diagram of a part of the fluid supply network with a key metering point.

FIG. 5 shows a preferred embodiment of a key metering point 14 where the pressure sensor 16 and the consumption gauge 17 of the key metering point 14 are located in different places. The consumption gauge 17 is located downstream of the pressure sensor 16, where the direction of flow is from the node 12 to the consumer 18 and the consumption gauge 17 is located between the pressure sensor 16 and the consumer 18.

Figure 6:
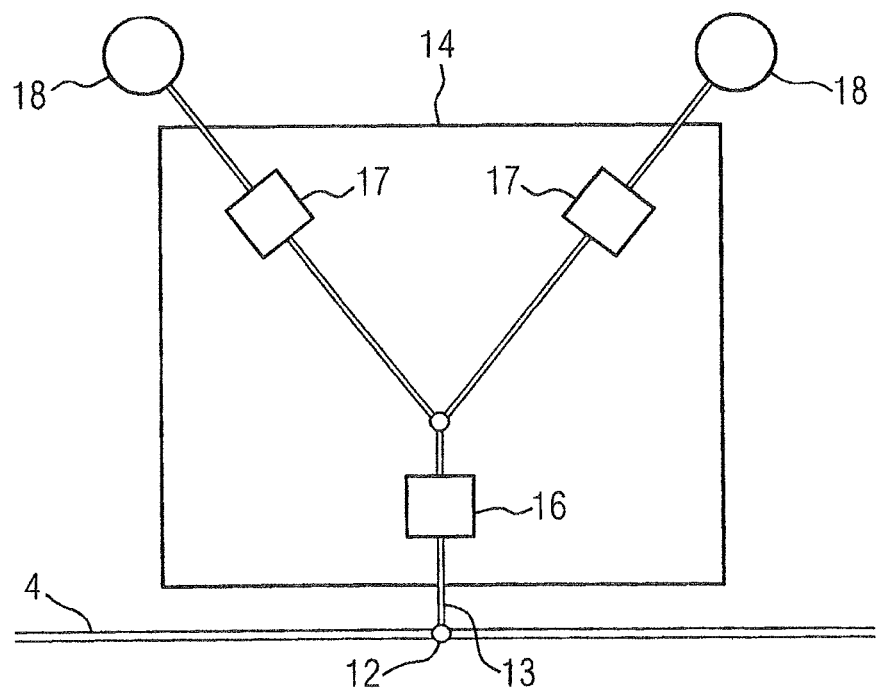
FIG. 6 shows a block diagram of a part of the fluid supply network with a key metering point equipped with a plurality of the consumption gauges.

FIG. 6 illustrates a key metering point 14 with a plurality of the consumption gauges 17. The consumption gauges 17 are installed downstream the pressure sensor 16. It might happen when the pressure sensor 16 is installed on the distribution pipe 13 that provides fluid to the conglomerate of consumers 18, e.g., a house with a plurality of apartments, while the consumption gauges 17 are installed in every apartment. Here, the total consumption of all consumers 18 that are located downstream the key metering point should be taken for further calculation the fluid flow $Q_i$.

In a possible embodiment, the fluid supply network is a water supply network and the discrete area is a district metered area DMA.

Figure 7:
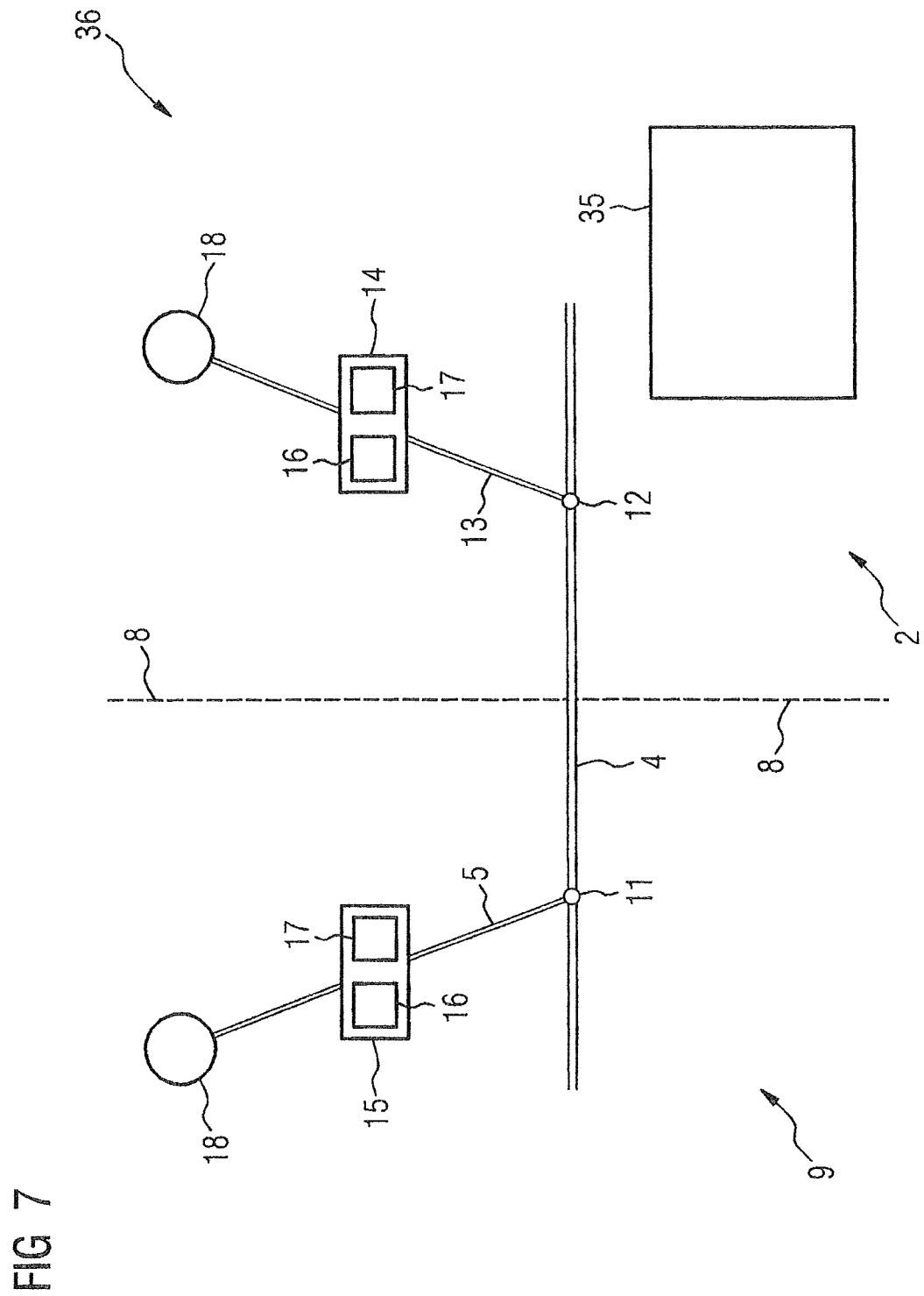
FIG. 7 shows a block diagram of the system in accordance with the present invention.

FIG. 7 shows a system 36 for fluid flow measurement for a discrete area 2 of a fluid supply network in accordance with the present invention. The system 36 as described above in the FIG. 2 comprises a plurality of key metering points, i.e., at least two, 14, 15, where each key metering point 14, 15 is located on a distribution pipe 5, 13 respectively and equipped with a pressure sensor 16 and a consumption gauge 17.

Each pressure sensor 16 is configured to perform a measurement of fluid pressure $P_i$ in the distribution pipe 5, 13 at which the pressure sensor 16 is installed. Each consumption gauge 17 is configured to measure fluid consumption $q_i$ by consumers 18 that are fluidly connected by the distribution pipe 5, 13. Moreover, at least one key metering point 14 is located inside the discrete area 2 and at least one key metering point 15 is located in the further area 9, i.e., outside of the discrete area 2. The key metering points 14, 15 are configured to provide measured data.

The system also comprises a control unit 35 configured to perform calculation of the fluid flow by using the measured data in accordance with the method of the disclosed embodiments.

While the invention has been illustrated and described in detail with the help of preferred embodiment, the invention is not limited to the disclosed examples. Other variations can be deducted by those skilled in the art without leaving the scope of protection of the claimed invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for fluid flow measurement in at least one main pipe for a discrete area of a fluid supply network, the fluid supply network comprising a network of pipes for delivering a fluid to consumers, the network of pipes comprising the at least one main pipe to transport fluid from a source into the fluid supply network, the main pipe crossing a boundary between the discrete area and a further area of the fluid supply network, and a plurality of distribution pipes, each distribution pipe being configured to transport fluid from the main pipe to a consumer directly connected to the distribution pipe, and the network of pipes further comprising a plurality of nodes that are junctions of at least two pipes, two of said nodes located on the same main pipe on different sides of the boundary without any further nodes located therebetween being boundary nodes, and further comprising a plurality of key metering points in which each key metering point is located on a distribution pipe and equipped with a pressure sensor and a consumption gauge, each pressure sensor being configured to perform a measurement of fluid pressure in the distribution pipe at which the pressure sensor is installed, and each consumption gauge being configured to measure fluid consumption by consumers which are directly connected to the distribution pipe on which the consumption gauge is installed, the method comprising:
   a) taking measurements of the fluid pressure and the fluid consumption on at least one selected first key metering point which is located inside the discrete area;
   b) taking measurements of the fluid pressure and the fluid consumption on at least one selected second key metering point which is located inside the further area;

c) calculating the fluid flow using the fluid pressures and the fluid consumptions measured on selected key metering points.

2. The method of claim 1, wherein within step c) the fluid flow is calculated in accordance with the following relationship:

$$Q_i^\gamma = \frac{\Delta P^P}{R} = \frac{(P_1 + q_1^\gamma R_1) - (P_2 + q_2^\gamma R_2)}{R},$$

where
$Q_i$ is a fluid flow on the at least one main pipe that crosses the boundary of the discrete area, $\Delta P^P$ is a is a pressure drop between the boundary nodes, R is an equivalent hydraulic resistance of the main pipe which crosses the boundary of the discrete area, $R_1$, $R_2$ are equivalent hydraulic resistances of the distribution pipes on which the selected key metering points are installed, $P_1$, $P_2$ are the fluid pressures in the distribution pipes measured by the pressure sensors which are installed at the selected key metering points, $q_1$, $q_2$ are the fluid consumptions at the selected key metering points measured by the consumption gauges, and $\gamma$ is a flow exponential parameter.

3. The method of claim 2, wherein each key metering point is located on a distribution pipe and is equipped with a pressure sensor and a consumption gauge; and
wherein the pressure sensor and the consumption gauge are located on different places on the distribution pipe, such that the consumption gauge is located downstream the pressure sensor.

4. The method of claim 1, wherein for the measurements of step a) at least one selected first key metering points inside the discrete area is selected, such that the selected first key metering points are located on distribution pipes which are directly connected to the boundary node that is inside of the discrete area;
wherein only said first key metering points are selected and used for the measurement of step a), which are located next to the boundary node inside the discrete area;
wherein for the measurement of step b) at least one selected second key metering points outside the discrete area is selected, such that the selected second key metering points are located on distribution pipes which are directly connected to the boundary node which is outside of the discrete area.

5. The method of claim 4, wherein each key metering point is located on a distribution pipe and is equipped with a pressure sensor and a consumption gauge; and
wherein the pressure sensor and the consumption gauge are located on different places on the distribution pipe, such that the consumption gauge is located downstream the pressure sensor.

6. The method of claim 1, wherein each key metering point is located on a distribution pipe and is equipped with a pressure sensor and a consumption gauge; and
wherein the pressure sensor and the consumption gauge are located on different places on the distribution pipe, such that the consumption gauge is located downstream the pressure sensor.

7. The method of claim 6, wherein each key metering point is equipped with the plurality of the consumption gauges which are located downstream of the pressure sensor; and
wherein the fluid consumption on each key metering point is a total fluid consumption measured via the plurality of consumption gauges.

8. The method of claim 1, wherein the fluid supply network comprises a water supply network and the discrete area comprises a district metered area (DMA).

9. A system for fluid flow measurement in at least one main pipe for a discrete area of a fluid supply network, the fluid supply network comprising:
a network of pipes for delivering a fluid to consumers, the network of pipes comprising:
the at least one main pipe to transport fluid from a source into the fluid supply network, the at least one main pipe crossing a boundary between the discrete area and a further area of the fluid supply network and a plurality of distribution pipes, each distribution pipe being configured to transport fluid from the main pipe to a consumer directly connected to the distribution pipe; and
a plurality of nodes which are junctions of at least two pipes, two of said nodes which are located on the same main pipe on different sides of the boundary without any further nodes located therebetween being boundary nodes;
a plurality of key metering points in which each key metering point is configured to be located on a distribution pipe and is equipped with a pressure sensor and a consumption gauge, each pressure sensor being configured to perform a measurement of fluid pressure in the distribution pipe at which the pressure sensor is installed, each consumption gauge being configured to measure fluid consumption by consumers that are directly connected by the distribution pipe, at least one key metering point being located within the discrete area and at least one key metering point being located within the further area, which is outside of the discrete area and the key metering points being configured to provide measured fluid pressure and the measured fluid consumption; and
a control unit configured to calculate the fluid flow using the measured fluid pressure and the measured fluid consumption on the key metering points.

\* \* \* \* \*